Nov. 26, 1968  J. P. HANNWACKER ET AL  3,413,567
LASER REFLECTOR AND COOLING MEANS
Filed July 5, 1963  2 Sheets-Sheet 1
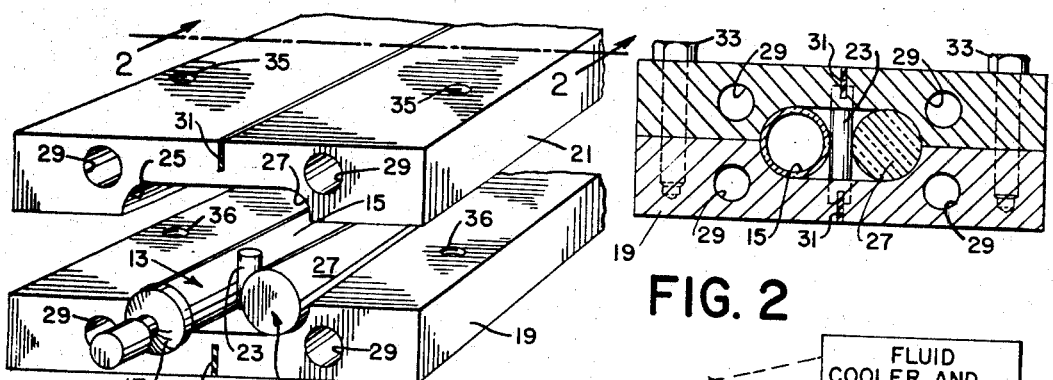
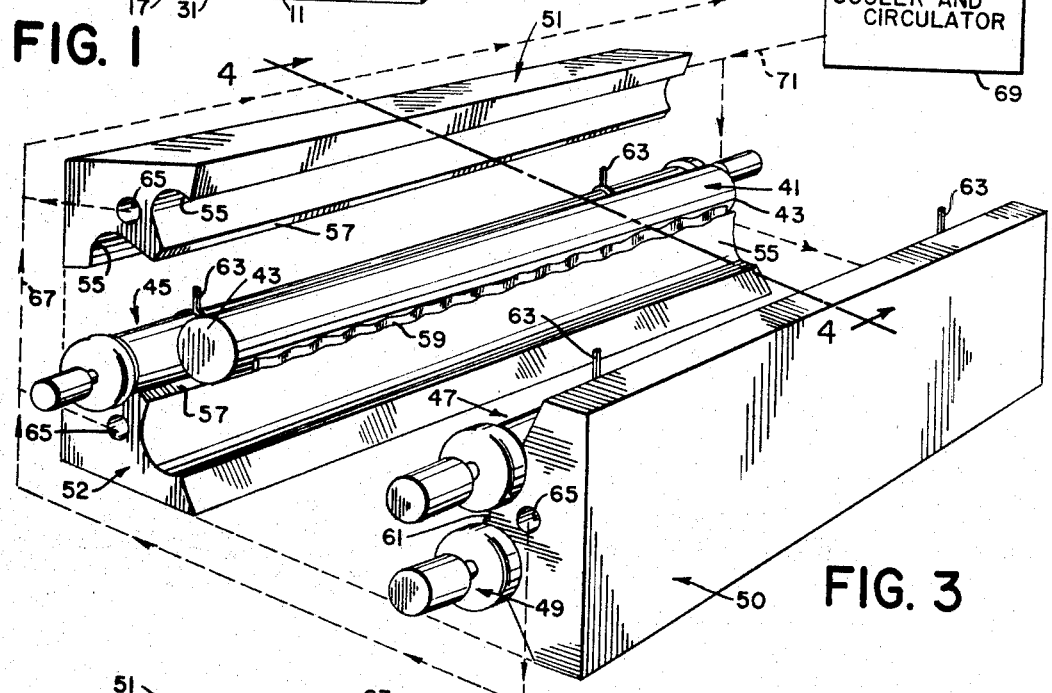
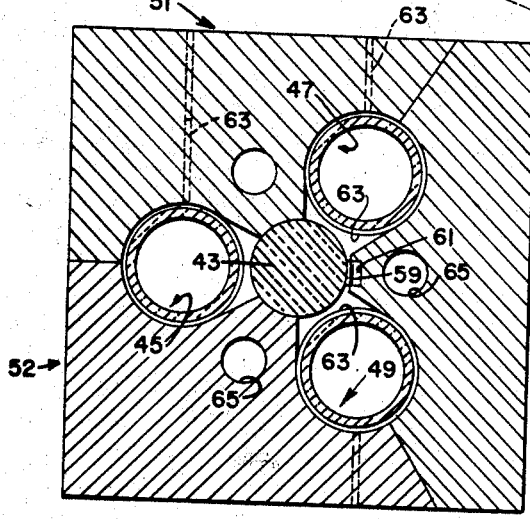
INVENTORS
JOSEPH P. HANNWACKER
HAROLD A. KRAMER
BY Darby & Darby
ATTORNEYS

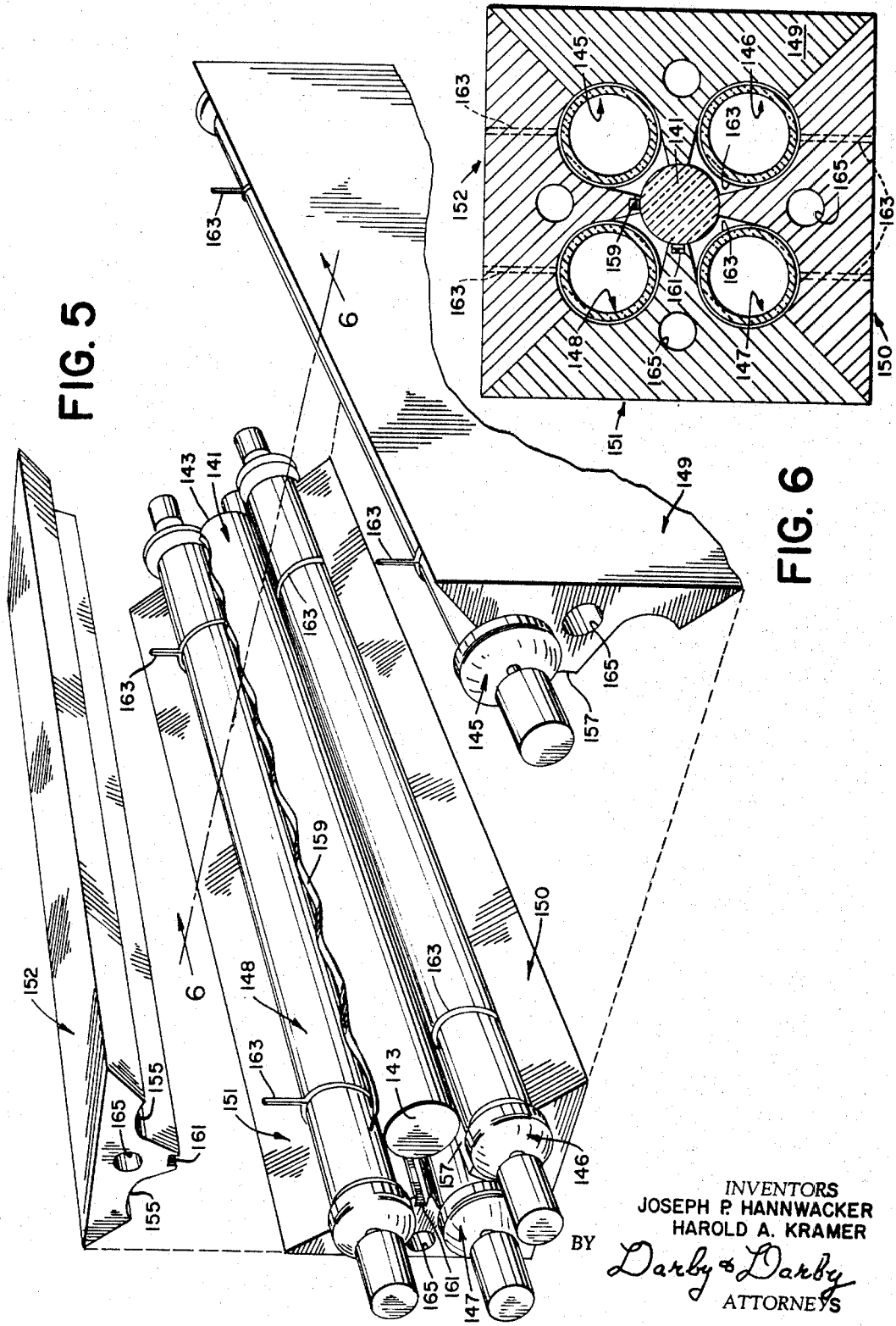

United States Patent Office 3,413,567
Patented Nov. 26, 1968

3,413,567
LASER REFLECTOR AND COOLING MEANS
Joseph P. Hannwacker, Plainview, and Harold A. Kramer, Wantagh, N.Y., assignors to Fairchild Hiller Corporation, a corporation of Maryland
Filed July 5, 1963, Ser. No. 292,912
8 Claims. (Cl. 331—94.5)

ABSTRACT OF THE DISCLOSURE

This disclosure relates to optically excited lasers devices with a reflective enclosure portions of which are effective both for directing the excitation light and for transferring heat from the laser material by conduction for cooling purposes.

---

Lasers are devices for amplifying or generating light (usually coherent light) by the phenomenon of amplification by stimulated emission of radiation. While a relatively new development, lasers and laser operation generally is amply described in the literature and such description will not be repeated here.

Lasers employing solid state laser materials are commonly optically excited by a gas-discharge lamp, for example a xenon gas-discharge flash-lamp. In many applications the light intensity from the discharge lamp is very high and there is unavoidably produced in the laser material a substantial heating effect.

Solid state laser materials in common use, such as ruby, operate most satisfactorily at very low temperatures, and, in general, if such lasers are to be operated at a reasonably high pulse rate it is necessary to provide efficient cooling. In many instances it will be desired to cool the laser material to very low temperatures, for example liquid nitrogen temperature, in order to take advantage of the improved characteristics at low temperatures.

Various means for cooling solid state lasers have been proposed, such as surrounding the laser rod with a transparent container of liquid nitrogen or other coolant. In such a case means must be provided for replacing the liquid nitrogen as its temperature is raised and it vaporizes. Arrangements of this sort create severe thermal problems and further provide considerable difficulty in obtaining efficient transmission of light through the liquid nitrogen coolant. Further problems are created by bubbling in the nitrogen coolant.

Other expedients such as the use of air or other gaseous coolant have been proposed but in general techniques and apparatus proposed for cooling solid state lasers in a simple and efficient manner have been unsatisfactory for one reason or another.

The apparatus according to the present invention provides means for removal of heat from the solid state laser rod by conduction of the thermal energy through a good conductor of heat having a substantial effective cross-section for heat conduction. The heat conduction structure is preferably formed integrally with a reflective enclosure for directing the light from the gas discharge lamp into the laser material.

While it is contemplated that apparatus according to the invention will be particularly useful in connection with solid state lasers, it may also find application with respect to gaseous or liquid laser materials.

It is an object of the present invention to provide a laser with a compact enclosure for the laser material and exciting lamp which is adapted to efficiently direct the light from the lamp into the laser material.

It is another object of the present invention to provide an enclosing supporting structure for a laser rod adapted to allow efficient transmission of light into the rod while at the same time providing a path for conduction of heat from the rod, which path is of substantial effective cross sectional area.

It is a still further object of the present invention to provide an optically excited laser which is of simple construction but which may be efficiently operated at low temperature.

Other objects and advantages will be apparent from a consideration of the following description in conjunction with the appended drawings in which:

FIGURE 1 is a fragmentary isometric exploded view of an optically excited laser according to the present invention;

FIGURE 2 is a sectional view of the apparatus of FIGURE 1 taken along the line 2—2 in FIGURE 1;

FIGURE 3 is a partially schematic isometric exploded view of an alternative form of apparatus with three gaseous discharge lamps;

FIGURE 4 is a sectional view of the apparatus of FIGURE 3 taken along the line 4—4 in FIGURE 3;

FIGURE 5 is a fragmentary isometric exploded view of a further alternate form of the invention having four gaseous discharge lamps; and FIGURE 6 is a sectional view of the apparatus of FIGURE 5 taken along the line 6—6 in FIGURE 5.

Referring now to FIGURES 1 and 2, an optically-excited laser is shown comprising a cylindrical rod 11 of laser material. The rod 11 may be formed of any of various forms of solid state laser materials, the most common material presently being ruby.

A gas discharge lamp 13 provides the light excitation for the laser material of rod 11. The lamp 13 comprises a cylindrical envelope 15 on the ends of which are caps 17 including the electrical terminals for the lamp. Customarily the lamp 13 will be pulsed to obtain the necessary high intensity of light, and, of course, the operation of the laser will likewise be pulsed.

In the absence of an enclosure for the lamp 13 and the rod 11, it is apparent that a relatively small portion of the light from the lamp would be transmitted into the rod 11. Reflective enclosures have heretofore been provided for concentrating a greater portion of the output of the exciting lamp onto the laser rod. Elliptical reflectors have been utilized, and diffuse reflectors of various shapes have been employed.

In such previous reflecting structures it has been generally the practice to separate the reflecting walls by a substantial distance from the lamp and the laser rod. In the case of elliptical reflectors this is obviously necessary in order to place the lamp and rod at respective foci of the ellipse. It will be noted in the apparatus of FIGURE 1 that a reflecting structure is provided comprising blocks 19 and 21, which are formed of a material with good heat conductivity, such as aluminum, copper or silver.

The blocks 19 and 21 are grooved to receive the lamp 13 and the rod 11. The lamp 13 and rod 11 are preferably held out of physical contact by spacers such as illustrated at 23. Spacers 23 do not substantially interfere with the transmission of light since they are small and may be only two in number. The spacers 23 are preferably of a material with low heat conductivity and may be formed of nylon or glass, for example. The cylindrical shape of the spacers 23 is preferred to further reduce heat conduction between lamp 13 and rod 11.

The concave surfaces 25 and 27 are shaped to conform, respectively, to the shape of lamp 13 and rod 11. In the forms of the invention illustrated, the lamp 13 and the rod 11 are cylindrical, but it should be appreciated that either lamp 13 or rod 11, and particularly the latter, may be formed in a different shape, such as prismoidal shape, if desired. It should further be noted that it may be desired that the enclosure blocks 21 and 19 not be shaped to conform to the shape of lamp 13 so that they will not be in physical heat conducting contact therewith over a large area as illustrated in FIGURES 1 and 2.

Conduits 29 are provided in blocks 19 and 21 for the passage of coolant, for example liquid nitrogen. For simplicity the apparatus for circulating the coolant through conduits 29 has been omitted in FIGURES 1 and 2. It may be desirable to reduce the heat conduction through enclosure blocks 19 and 21 which would tend to carry heat from the lamp side of the enclosure to the laser rod side of the enclosure. Accordingly, heat barriers 21 of insulating material may be inserted along the medium line of the blocks 19 and 21.

FIGURE 2 illustrates the apparatus in assembled form where the blocks 19 and 21 are secured together by suitable means, such as bolts 33 passing through holes 35 in block 21 and into tapped holes 36 in block 19.

The operation and advantages of the apparatus of FIGURES 1 and 2 will in some respects be apparent but will be better understood from the following explanation.

The lamp 13 is energized from a suitable source which is omitted from the drawings for simplicity. Light, generally in pulses of very high intensity, is emitted by the lamp 13. A portion of this light is emitted toward the rod 11 and is transmitted into the rod directly. Part of the light, however, would not, in the absence of an enclosure, strike rod 11. In the apparatus of FIGURES 1 and 2, however, such light is reflected from the concave surfaces of blocks 19 and 21 and, except for the small portion absorbed by the surfaces, will eventually be transmitted to the rod 11. The reflecting surfaces may be provided with high reflectivity simply by polishing the surface in case aluminum is used as the material of the blocks 19 and 21. If desired, however, a coating of high reflectivity such as chromium may be plated or otherwise be deposited on the concave surfaces of blocks 19 and 21. This would especially be desirable in the event that material such as copper were used for blocks 19 and 21. It is contemplated that generally a specularly reflecting surface will be provided at 25 and 27, but in some cases a diffusely reflecting surface may be preferred.

It will be seen from the foregoing explanation that while the enclosure for the laser rod and lamp is of the utmost simplicity, it is nevertheless very effective to direct the light from the lamp 13 into the rod 11. A further advantage may accrue by virtue of the reflection of light from surfaces 27 which otherwise would have passed through and emerged from the laser rod.

The enclosure of FIGURES 1 and 2 comprising blocks 19 and 21 is also, in spite of its simplicity, very effective in facilitating cooling of the rod 11. It will be noted that the blocks 21 and 19 are in physical heat-conducting contact with substantially one-half the peripheral surface of the rod 11. The surfaces 27 of blocks 19 and 21 may be maintained substantially at the temperature of the coolant, for example liquid nitrogen, by virtue of the fact that there will be little temperature gradient between the conduits 29 and the surfaces 27 (the material has a high heat conductivity and the cross-sectional area of the heat-conducting path is large compared with the length of the heat-conducting path). While four conduits 29 have been illustrated, a greater or lesser number of conduits may be provided as required. Fins or other known means may be provided in conduits 29 to facilitate heat exchange between blocks 19 and 20 and the coolant.

The relationship of the lamp 13 to the surfaces 25 is similar to that previously explained with respect to rod 11 and surfaces 27. Thus, lamp 13 may be cooled by the coolant flowing in the two adjacent conduits 29. It may be desired to cool lamp 13 to a lesser degree. This may readily be accomplished by providing a higher temperature coolant through its associated conduit or by providing a lesser volume of coolant or by other suitable means. Particularly in the event that lamp 13 is to be operated at a substantially higher temperature than rod 11, it may be desirable to thermaly isolate the two halves of the enclosure by suitable heat barriers 31. These barriers may, of course, be replaced by other heat transfer blocking arrangements or may be omitted, if desired.

It will be noted that this invention is concerned with providing exciting light for the laser material with a high degree of efficiency and with providing means for cooling the laser material. A description of the quantum mechanics principles upon which the operation of the laser is based has been omitted for the sake of simplicity. Great numbers of articles are available in the literature describing operation of lasers in general and solid-state lasers in particular.

FIGURE 3 shows an alternative form of apparatus according to the invention wherein provision is made for three lamps to provide greater light intensity for excitation of the laser material. A laser rod 41 is surrounded by three gas discharge lamps 45, 47 and 49. The rod 41 may be provided with reflective or partially reflective coatings on the ends 43 as is well konwn in the art.

A reflective enclosure is provided for rod 41 and lamps 45, 47 and 49. The enclosure comprises blocks 50, 51 and 52.

Blocks 50, 51 and 52 are provided with grooves 55, the surfaces of which are shaped to conform, generally, to the shape of lamps 45, 47 and 49. Concave surfaces 57 are also provided on the blocks, which surfaces conform in shape to the shape of laser rod 41. As in the case of the apparatus of FIGURES 1 and 2, the rod 41 need not be cylindrical and could be prismoidal or another suitable shape. In such case the surfaces 57 would not be cylindrical but would conform to such other shape of the rod 41.

It may be desirable to provide means for resiliently urging rod 41 into contact with surfaces 57. For this purpose a serpentine ribbon of resilient material 59 is provided, and a channel 61 is provided in block 50 for retaining the ribbon 59. Obviously, alternative means could be provided for resiliently urging surfaces 57 against laser rod 41. For example, blocks 50, 51 and 52 may be shaped so that they are slightly out of mutual contact when rod 41 is in place and the blocks 50, 51 and 52 may be held and urged together by resilient means.

It may be desired that lamps 45, 47 and 49 not be in heat conductive contact with blocks 50, 51 and 52. In such case the lamps may conveniently be positioned by retaining rings 63 so that the lamps are held slightly spaced from the surfaces of grooves 55 as illustrated, for example, in FIGURE 4.

Conduits 65 are provided in blocks 50, 51 and 52 for the passage of coolant such as liquid nitrogen. It will be noted that the conduits are located in proximity to the surfaces 57 to facilitate heat transfer from the laser rod to the coolant. Numerous forms of appartus for supplying and circulating coolant are well known and these may be of the recirculating type as indicated schematically in FIGURE 3. Conduits 65 are connected at one end with suitable fluid input lines 71 and at the other end with fluid exhaust line 67. The lines 67 and 71 are connected to a fluid cooler and circulator 69. Thus, the heat which absorbed by the coolant, by vaporation or otherwise, is removed by the fluid cooler and circulator 69 after which the coolant is recycled through conduits 65.

The apparatus listed in FIGURE 3 will be seen to have generally the same advantages as were explained with reference to FIGURES 1 and 2. In addition, the greater number of discharge lamps in the embodiment of FIGURES 3 and 4 provides greater light intensity, or in the event that the lamps are operated cyclically rather than simultaneously, a higher pulse rate could be provided from the apparatus of FIGURES 3 and 4.

A still larger number of lamps may be provided in apparatus according to the present invention. A four-lamp arrangement is shown in FIGURES 5 and 6 but the number of lamps is of course not limited to four.

The construction of the apparatus of FIGURES 5 and 6 is generally similar to that already described with respect to FIGURES 1 and 3.

A laser rod 141 is provided having flat ends 143 which may be reflective or partially reflective. Gas discharge lamps 145, 146, 147 and 148 are arranged about the laser rod 141. Lamps 145–148 and rod 141 are supported by an enclosure comprising blocks 149, 150, 151 and 152.

Blocks 149–152 are provided with grooves 155 having concave reflective surfaces conforming approximately to the shape of lamps 145–148. Blocks 149–152 are also provided with concave surfaces 157 conforming to the shape of rod 141, which, merely for illustrative purposes, is shown as cylindrical.

Suitable means may be provided for urging rod 141 into contact with surfaces 157, such as serpentine strips of resilient material 159 retained in channels 161. Alternative means for maintaining intimate contact between rod 141 and surfaces 157 may be utilized as previously described with reference to FIGURES 3 and 4.

Lamps 145–148 may be retained in position and at the same time slightly spaced from surfaces 155 by retaining rings 163. Conduits 165 through blocks 149–152 are provided for the passage of coolant as described and illustrated with respect to FIGURES 3 and 4.

The means for circulating and cooling the coolant has for simplicity been omitted in FIGURES 5 and 6 (and also in FIGURES 1 and 2). It will be understood that means such as schematically illustrated and described with respect to FIGURES 3 and 4 are also applicable to the apparatus of FIGURES 1 and 2 and the apparatus of FIGURES 5 and 6. In general, various features illustrated in certain of the three different embodiments may also be utilized with respect to others of the three embodiments.

An important characteristic of the apparatus is its compact arrangement of elements. Note for example that, in general the enclosure substantially surrounds the lamp or lamps and laser material and the spacing between lamps and laser material and the spacing between the surfaces of the enclosure and the lamps and laser material all are less than the minimum cross-sectional dimension of the laser material.

From the foregoing explanation it will be appreciated that laser apparatus is provided by the present invention which has a particularly simple reflecting and heat-removing enclosure, which enclosure is nevertheless remarkably effective in achieving maximum utilization of the light from the one or more discharge lamps and in removing heat from the laser material so that it may be maintained at a low temperature during operation. It may be noted that the heat is conducted away from only a fractional portion of the periphery of the laser rod and it would be expected that temperature gradients would arise in laser material. It has been experimentally determined that any such gradients which are produced are not of a harmful character and that the operation of the laser is not noticeably different than in apparatus where the heating and cooling effects on the laser rod are substantially uniform around the periphery.

While several embodiments of the present invention have been shown or suggested, it should be appreciated that numerous other variations and modifications will be apparent to those skilled in the art. Accordingly, it is not intended that the invention be limited to those embodiments shown or suggested, but rather that it be defined by reference to the appended claims.

What is claimed is:

1. An optically excited laser comprising a volume of laser material, at least one lamp for exciting said laser material located externally thereof, a reflective enclosure for said lamp and laser material, said enclosure supporting said lamp and laser material in close-spaced relation, said enclosure being shaped to provide a substantially unobscured light path between said lamp and said laser material, said enclosure having a portion adjacent to and having a surface conforming to the shape of a portion of the surface of said volume of laser material and in heat-conducting relation therewith, at least the portion of said enclosure adjacent said laser material surface being formed of heat conductive material, and heat exchange means for removing heat from said heat conductive portion of said enclosure whereby exciting light may be transmitted efficiently from said lamp into said laser material and heat may efficiently be removed from said laser material.

2. An optically excited laser comprising an elongated volume of laser material, at least one elongated lamp for exciting said laser material located externally thereof, a reflective enclosure for said lamp and laser material, said enclosure supporting said lamp and laser material in close-spaced substantially parallel relation, said enclosure having reflective surfaces adapted to reflect light emanating from at least a portion of the surface of said lamp, said enclosure further being shaped to provide a substantially unobscured light path between said lamp and said laser material, said enclosure having a further surface adjacent to and conforming to the shape of a longitudinally extending portion of the surface of said volume of laser material and in heat-conducting relation therewith, at least the portion of said enclosure adjacent said laser material surface being formed of heat conductive material, and heat exchange means for removing heat from said heat conductive portion of said enclosure whereby exciting light may be transmitted efficiently from said lamp into said laser material and heat may efficiently be removed from said laser material.

3. Apparatus as claimed in claim 2 wherein said enclosure substantially surrounds said lamp and laser material and wherein the spacing between said lamp and said laser material and the spacing between the surfaces of said enclosure and said lamp and laser material all are less than the minimum cross-sectional dimension of said laser material.

4. An optically excited laser comprising an elongated volume of laser material, at least one elongated lamp for exciting said laser material located externally thereof, said lamp cross-section being approximately the same size as the cross-section of said volume of laser material, a reflective enclosure for said lamp and laser material, said enclosure supporting said lamp and laser material in close-spaced substantially parallel relation, said enclosure having reflective surfaces generally conforming in shape to a protion of the surface of said lamp, said enclosure further being shaped to provide a substantially unobscured light path between said lamp and said laser material, said enclosure having a further surface adjacent to and conforming to the shape of a portion of the surface of said volume of laser material and in heat-conducting relation therewith, at least the portion of said enclosure adjacent said laser material surface being formed of heat conductive material, and heat exchange means for removing heat from said heat conductive portion of said enclosure whereby exciting light may be transmitted efficiently from said lamp into said laser material and heat may efficiently be removed from said laser material.

5. An optically excited laser comprising an elongated solid cylindrical volume of solid laser material, at least one elongated gas discharge lamp for exciting said laser material located externally thereof, said lamp cross-section being approximately the same size as the cross-section of said volume of laser material, a reflective metallic enclosure for said lamp and laser material, said enclosure supporting said lamp and laser material in close-spaced substantially parallel relation, said enclosure having specularly reflective surfaces generally conforming in shape to a portion of the surface of said lamp, said enclosure further being shaped to provide a substantially unobscured light path between said lamp and said laser material, said enclosure having a further surface adjacent to and conforming to the shape of a portion of the cylindrical surface of said volume of laser material and in heat-conducting relation therewith, at least the portion of said enclosure adjacent said laser material surface being formed of heat conductive material, and heat exchange means comprising at least one fluid conduit through said heat conductive material for removing heat from said heat conductive portion of said enclosure whereby, exciting light may be transmitted efficiently from said lamp into said laser material and heat may efficiently be removed from said laser material.

6. An optically excited laser comprising an elongated volume of laser material, at least three elongated lamps for exciting said laser material located externally thereof, a reflective enclosure for said lamps and laser material, said enclosure supporting each said lamp in close-spaced substantially parallel relation with respect to laser material, said enclosures having reflective surfaces generally conforming in shape to portions of the surfaces of said lamps, said enclosure further being shaped to provide a substantially unobscured light path between each said lamp and said laser material, said enclosure having further surfaces adjacent to and conforming to the shape of a portion of the surface of said volume of laser material and in heat-conducting relation therewith, at least the portion of said enclosure adjacent said laser material surface being formed of heat conductive material, and heat exchange means for removing heat from said heat conductive portion of said enclosure whereby exciting light may be transmitted efficiently from said lamp into said laser material and heat may efficiently be removed from said laser material.

7. Apparatus as claimed in claim 6 wherein said enclosure substantialy surrounds said lamps and laser material and wherein the spacing between said lamps and said laser material and the spacing between the surfaces of said enclosure and said lamps and laser material all are less than the minimum cross-sectionl dimension of said laser material.

8. An optically excited laser comprising an elongated cylindrical volume of solid laser material, at least three elongated cylindrical gas discharge lamps for exciting said laser material located externally threreof, said lamp cross-section being approximately the same size as the cross-section of said volume of laser material, a reflective metallic enclosure for said lamp and laser material, said enclosure supporting each said lamp in close-spaced substantially parallel relation with respect to said laser material, said enclosure having specularly reflective surfaces generally conforming in shape to portions of the surafces of said lamps, said enclosure further being shaped to provide a substantially unobscured light path between each said lamp and said laser material, said enclosure having a further surface adjacent to and conforming to the shape of a portion of the cylindrical surface of said volume of laser material and in heat-conducting relation therewith, at least the portion of said enclosure adjacent said laser material surface being formed of heat conductive material, and heat exchange means comprising fluid conduits through said heat conductive material for removing heat from said heat conductive portion of said enclosure whereby exciting light may be transmitted efficiently from said lamp into said laser material and heat may efficiently be removed from said laser material.

References Cited
UNITED STATES PATENTS

| | | | |
|---|---|---|---|
| 3,102,920 | 9/1963 | Sirons | 331—94.5 X |
| 3,172,056 | 3/1965 | Stitch | 331—94.5 |

JEWELL H. PEDERSEN, *Primary Examiner.*

W. L. SIKES, *Assistant Examiner.*